United States Patent [19]
Blair et al.

[11] Patent Number: 4,792,890
[45] Date of Patent: Dec. 20, 1988

[54] METHOD FOR RESOLVING CONFLICTS BETWEEN INTERRUPT SOURCES SHARING THE SAME PRIORITY LEVEL

[75] Inventors: Brian E. Blair; Mark H. Weiss, both of Raleigh, N.C.

[73] Assignee: International Business Machines Corp., Armonk, N.Y.

[21] Appl. No.: 815,434

[22] Filed: Dec. 31, 1985

[51] Int. Cl.⁴ .............................................. G06F 9/00
[52] U.S. Cl. ................................................... 364/200
[58] Field of Search ... 364/200 MS File, 900 MS File

[56] References Cited

U.S. PATENT DOCUMENTS 3,866,181  2/1975  Gayman et al. .................... 364/200
4,488,227  12/1984  Miu et al. .......................... 364/200

Primary Examiner—Gareth D. Shaw
Assistant Examiner—John G. Mills
Attorney, Agent, or Firm—Joscelyn G. Cockburn

[57] ABSTRACT

A method for controlling a processor in a data processing system so that multiple events are serviced on a single interrupt level. On the occurrence of a first interrupt request the processor is forced to run the routine that services the interrupt in a background mode. This is accomplished by immediately clearing the interrupt source, thus permitting the processor to accept new interrupt requests on the same level. On the occurrence of a second interrupt request, at the same level, the processor branches from executing the first interrupt routine on the background mode to service the second interrupt request on an interrupt level or foreground mode.

4 Claims, 8 Drawing Sheets

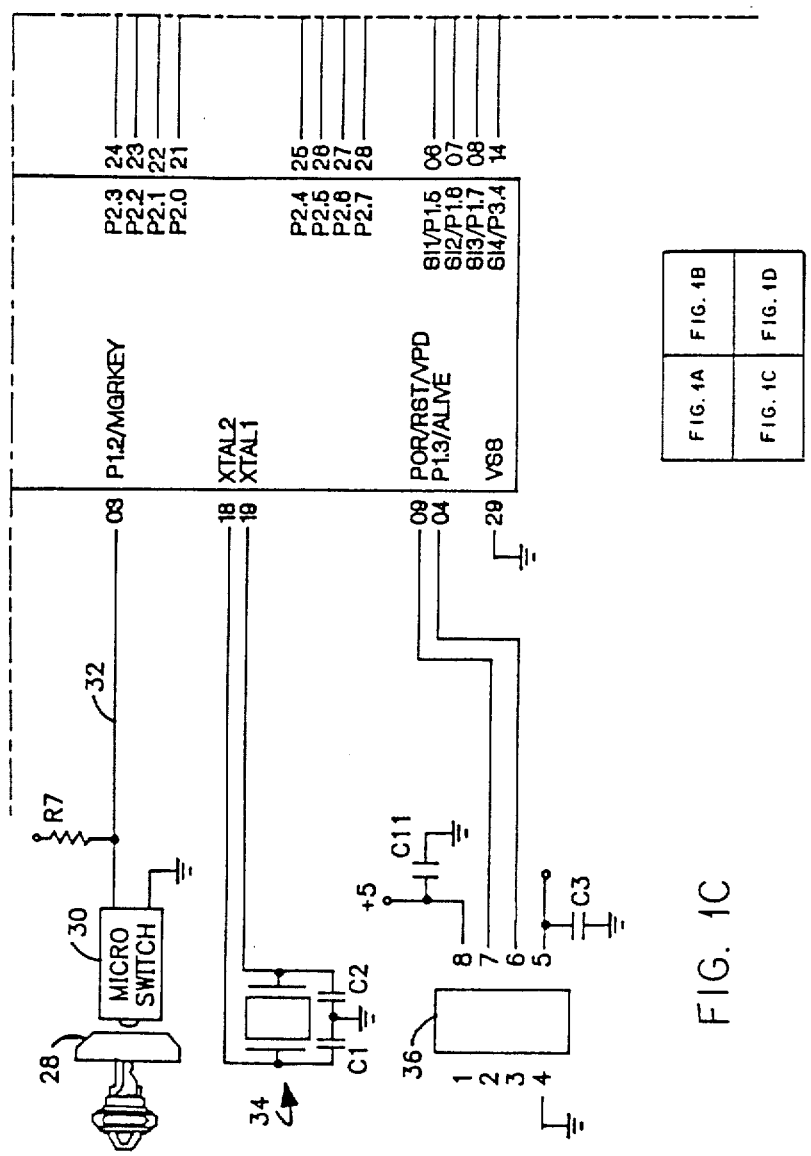

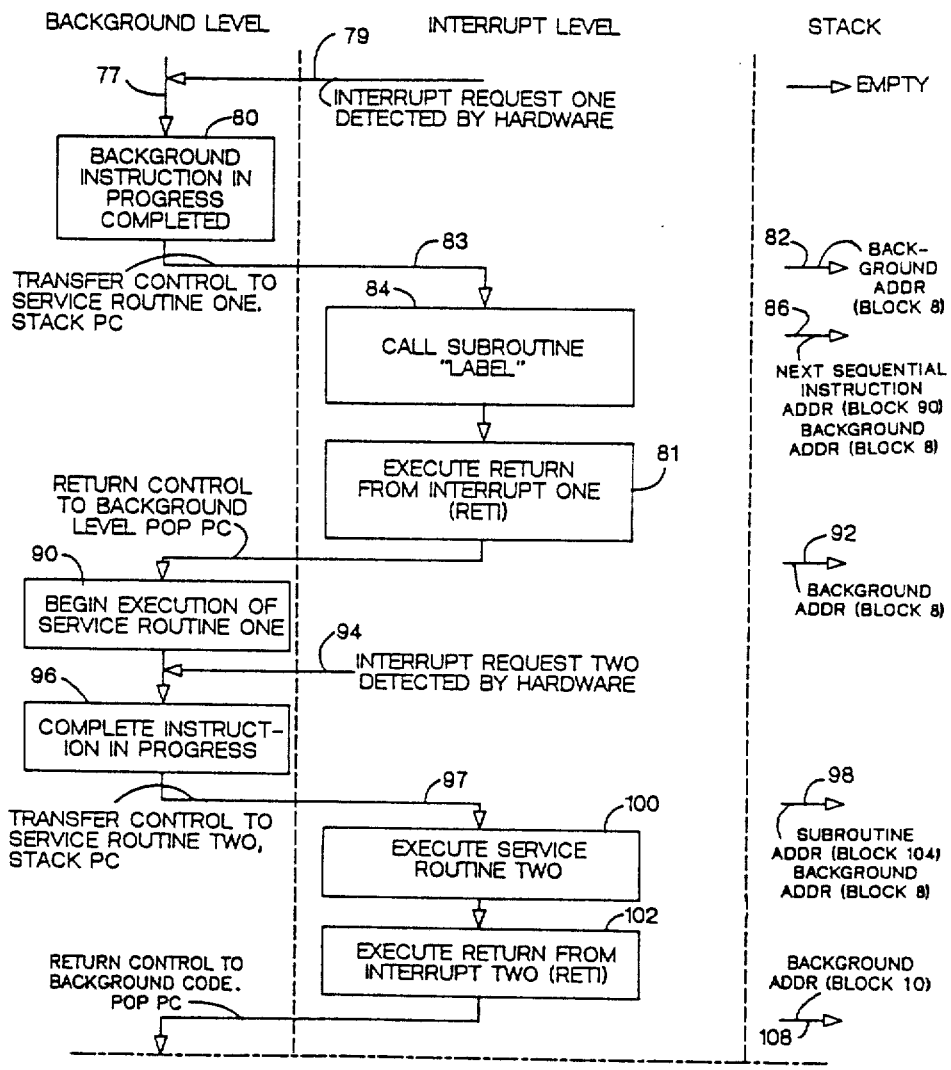

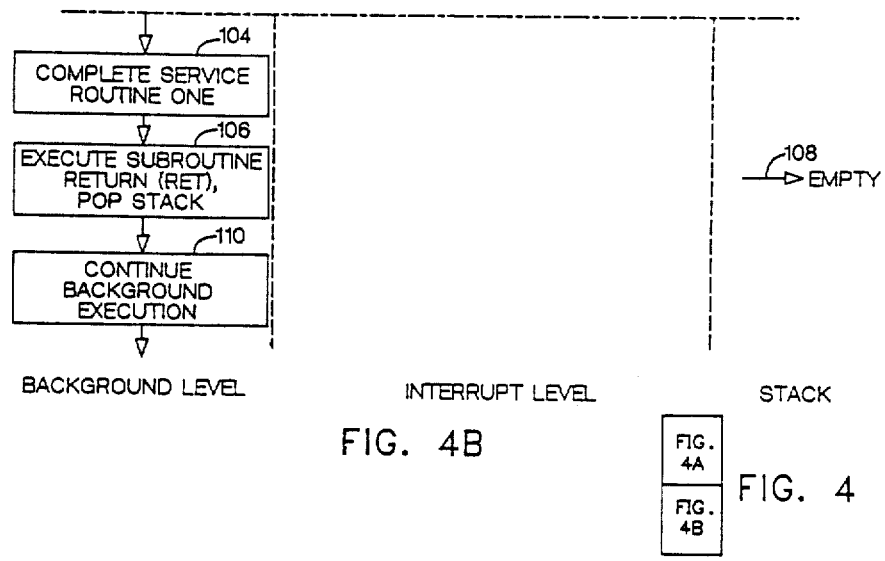
FIG. 4B
FIG. 4
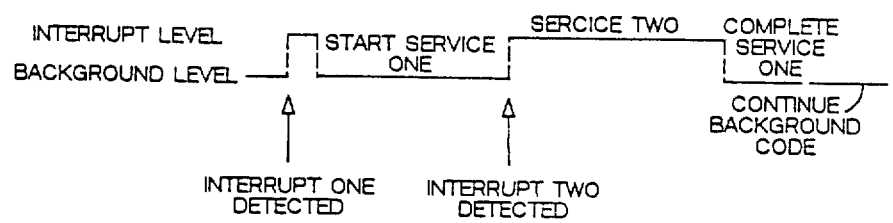
FIG. 5

METHOD FOR RESOLVING CONFLICTS BETWEEN INTERRUPT SOURCES SHARING THE SAME PRIORITY LEVEL

BACKGROUND OF THE INVENTION

1. Field of the Invention

The present invention relates to data processing systems in general and more particularly to interrupt systems for handling priority interrupt requests.

2. Prior Art

The processor in a typical data processing installation is often called upon to perform sundry tasks and/or events within the installation. The tasks may be external and/or internal to the processor. External tasks are usually associated with external events. Such events may include the reading of external sensors, accepting data from a communication channel, etc. Internal tasks may include sampling a condition following the expiration of an internal counter, etc.

In addition to the named tasks, the processor usually performs functions (sometimes called background functions) when its service is not required to handle the named tasks.

A typical processor usually operates at electronic speed. As such, it requires relatively short time intervals to complete assigned tasks. Similarly, it can perform a large number of tasks within a very short time interval. Notwithstanding its speed, the processor is a serial device. It can only perform a single task during a particular time interval. There are several tasks that require immediate attention once the vent that triggers the condition occurs. For example, real time peripherals usually require prompt attention. The situation is even more complicated because most real time peripherals run asynchronously to the execution of background code. This means the processor cannot predict the exact time when these devices require servicing.

To improve the versatility of the processor, an interrupt system is provided. The interrupt system includes several prioritized interrupt levels. A user usually assigns one or more events to one of the interrupt levels. Whenever the event occurs, an interupt request is raised. Depending on the level of the interrupt, the processor will either continue to execute the code it was executing at the time the new interrupt occurs or temporarily cease to process the code and branches to the new code that has to be executed in order to service the new interrupt. If the interrupt request is on a higher level than the one which is being executed, the processor branches and runs the new code. Following its completion, the processor returns to run the code from which it branches (i.e., the old code). On the other hand, if the interrupt request is on the same or lower level as the one which is being executed, the processor queues the interrupt request and continues to run the current code. Because of the immediate nature of some events, queueing is not an acceptable solution. It is the queueing problem that the present invention seeks to correct.

The prior art describes several interrupt systems. All of the disclosed systems and/or schemes are aimed at improving the efficiency of a processor to handle interrupts. For example, U.S. Pat. Nos. 4,001,783; 4,028,664; 4,172,284 and 3,905,025 set forth several devices and techniques for prioritizing the servicing of events on different interrupt levels of a processor interrupt heirarchy.

Still other prior art patents such as U.S. Pat. Nos. 4,456,970 and 4,459,657 set forth techniques and devices that allow a processor to branch from the code that services a low level priority event to the new code that services a high level priority event.

SUMMARY OF THE INVENTION

It is therefore the general object of the present invention to provide a technique that enables a processor to run prioritized tasks on a single interrupt level without queueing multiple interrupt requests.

The technique operates as follows. During the execution of background codes (i.e., code for servicing low priority tasks) if an interrupt occurs, the processor branches to execute codes that service the event that causes the interrupt. The address of the location, in the background code, where the processor was at the time of the interrupt is saved on a stack. In order to minimize the amount of time spent on the interrupt level, two instructions, namely: (a) "Call Sub-routine" (call) and (b) "Return from Interrupt" (RETI) are executed on the interrupt level. Executing the call instruction causes the next sequential address of the instruction scheduled to be processed to be saved on the stack on top of the background location. In this particular situation the interrupt level location is saved on the stack.

Executing the RETI instruction removes the interrupt level location from the top of the stack and loads it into the Program Counter (P.C.). Next, the processor will execute the service routine beginning at the address (location) in the P.C. It should be noted that the RETI instruction clears the source of the interrupt (i.e., resets all flags, etc.). The service routine (i.e., codes) that is related to the interrupt will be executed on the background level and the processor is now free to accept new interrupt requests in the same interrupt level. The new interrupt requests are serviced without delay.

Finally, a return (RET) instruction is executed when the service routine that handles the interrupt request is completed. This causes the original background location to be taken off the stack and placed in the program counter thereby allowing the processor to continue execution of the background code.

The foregoing and other objects, features and advantages of this invention will be more fully described in the accompanying description of the drawings.

BACKGROUND OF THE INVENTION

FIGS. 4, 4A and 4B show a functional flow chart for processing interrupts according to the teaching of the present invention.

FIG. 5 shows a timing diagram for the method of FIG. 4.

DESCRIPTION OF THE PREFERRED EMBODIMENT

The invention to be described hereinafter can be used for prioritizing interrupt requests in any type of data processing system. The invention works well in a store system and as such it will be described in that environment. However, this should not be construed as a limitation on the scope of the present invention since it is well within the skill of one skilled in the art to make minor chances to the present invention and apply the same to any computing system.

Figure 1A:
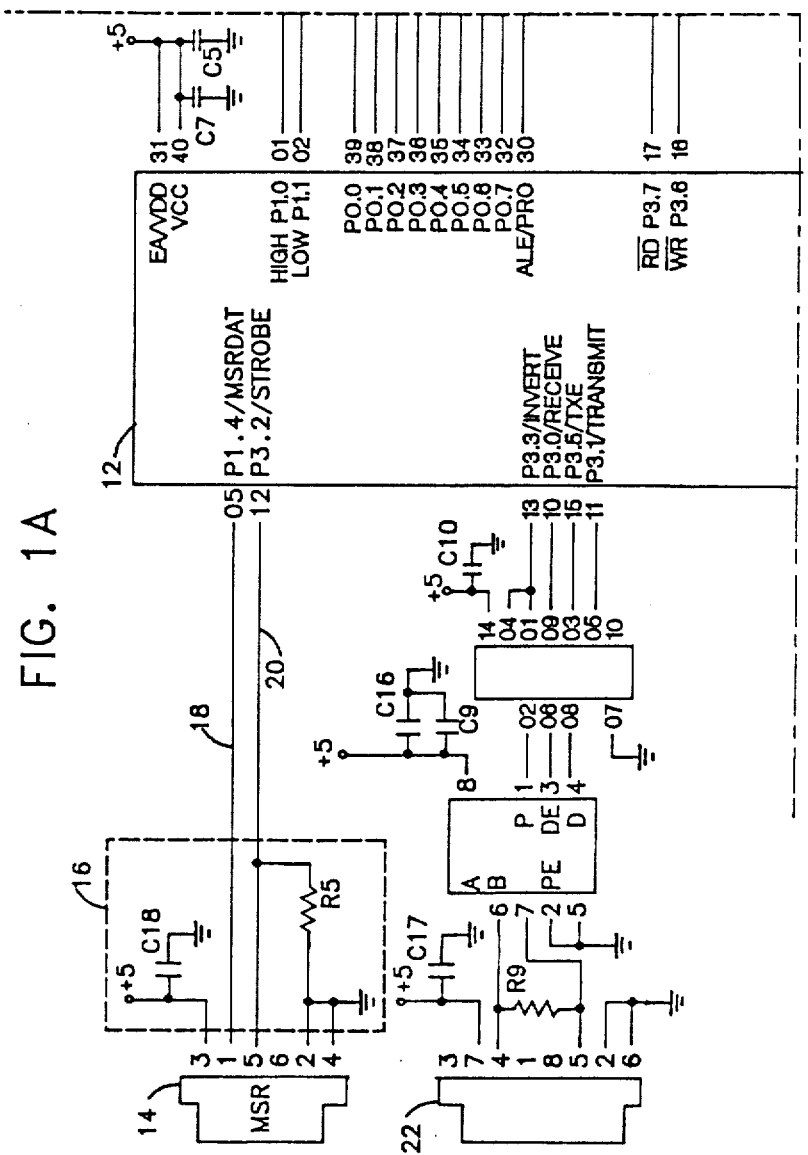
FIGS. 1, 1A and 1B show an electrical block diagram of a data processing system embodying the teachings of the present invention.
Figure 1B:
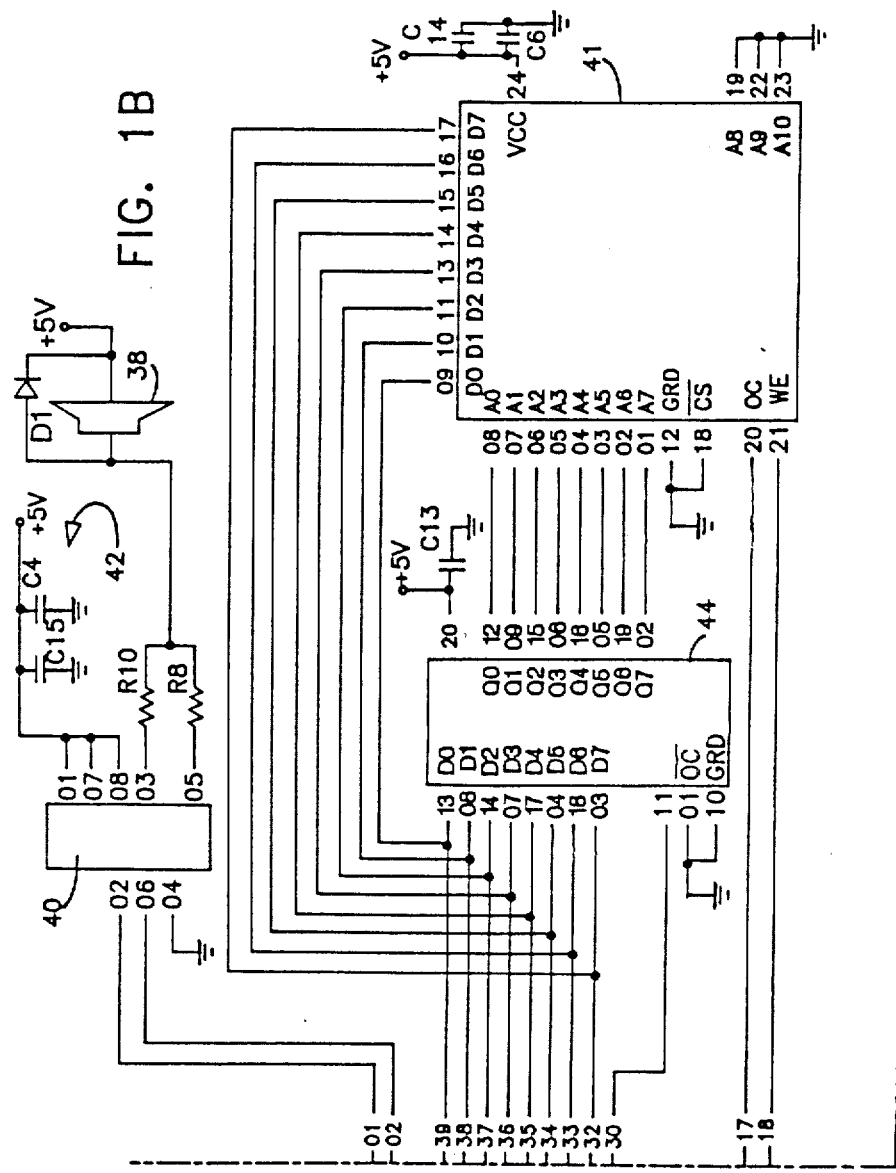
Figure 1D:
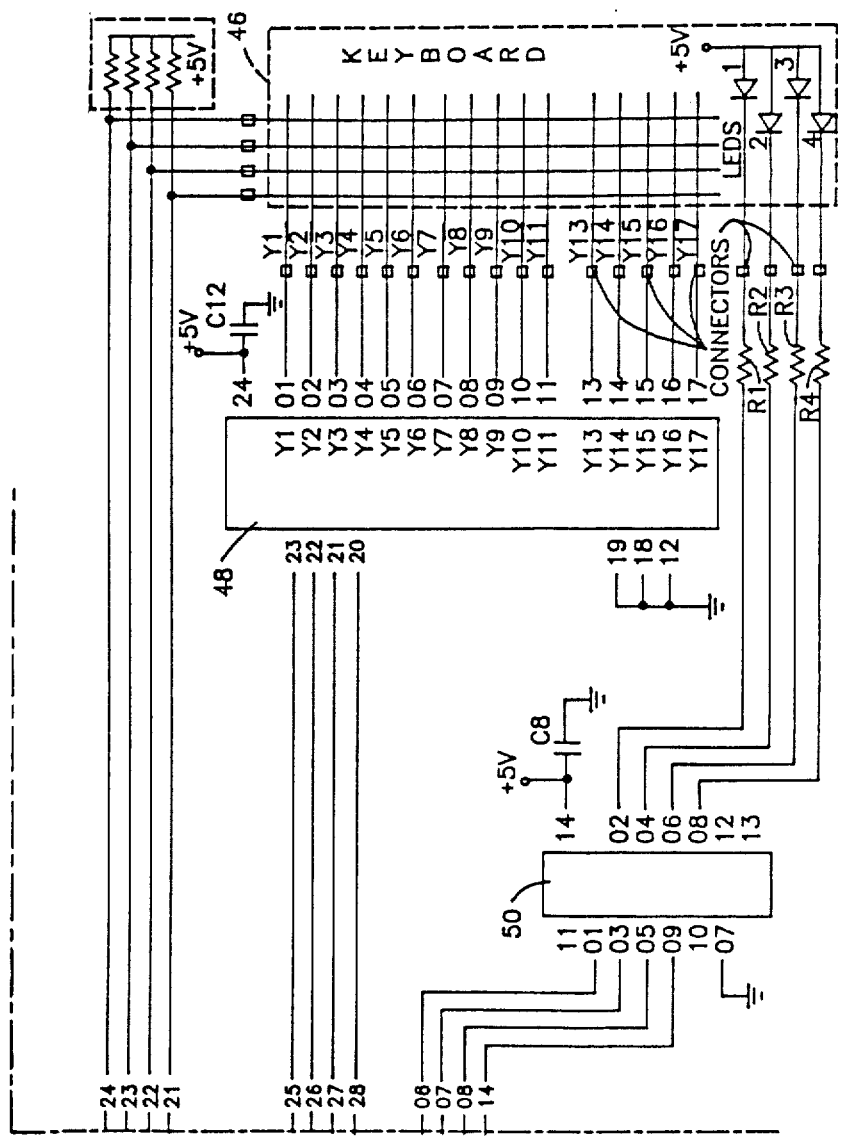

FIG. 1 shows an electrical block diagram for a data processing system identified by numeral 10. The data processing system 10 can be used in a store, retail establishment, etc. for tallying customer purchases, etc. The data processing system includes a microcontroller or microcomputer identified by numeral 12. As stated before, any type of microcomputer could be used. However, in the preferred embodiment of this invention the microcomputer is the 8051 microcontroller manufactured by the Intel Corporation. The 8051 microcontroller is a well known off-the-shelf microcomputer and as such details will not be given. However, if one wishes to determine the details of the microcontroller, then the Intel documentation which is supplied with the single chip microcomputer can be consulted. For purposes of the present invention, the 8051 microcontroller can be configured to perform a plurality of I/O functions and provide communications between the respective functions and a remote computing installation. The microcontroller is provided with two interrupt levels. Each of the I/O device requiring immediate attention and the communication channel must interrupt the microcontroller on one of these levels. If the interrupt is accepted, the microcontroller will abort the current job and execute code to service the device whose interrupt the microcontroller has accepted. Since the 8051 controller has only two interrupt levels, interrupt from each of the I/O devices and the communication channel must be tied to one of the respective interrupt levels. Stated another way, multiple interrupts must be serviced on a single interrupt level.

Still referring to FIG. 1, the I/O devices include a magnetic stripe reader (MSR), not shown. THe magnetic stripe reader is attached via connector 14 to network 16 and conductors 18 and 20 to pins 05 and 12 of the microcontroller. The magnetic stripe reader can be used for reading magnetic information such as those on credit cards. The signal on pine 12 is a strobe signal while that on pin 05 is the magnetic stripe reader data (MSR DAT). For example, when the strobe signal is activated, the microcontroller is interrupted. If the interrupt is accepted by the processor in the microcontroller, then the data on pin 05 is accepted.

The communications function is provided by connector 22 and modules 24 and 26 on pins 13, 10, 15 and 11 of the microcontroller. The receive signal is supplied on pin 10 while the transmit signal is provided on pin 11. Each of the modules (22, 24 and 26) is tied by a respective decoupling network to a +5 voltage supply and a ground supply. Signals from the communication channel (not shown) are received via connector 22 and amplified by module 24. A suitable driver module would be one that is manufactured by Texas Instruments (TI) Corporation and identified by part number 75176. The signals from module 24 are fed into module 26. Module 26 is an exclusive OR module and can be provided by module part number 74LS86 manufactured by Texas Instruments Corporation.

The manager's keylock 28 is sensed by lever switch 30 and fed via conductor 32 to pin 03 of the microcontroller. The microcontroller scans the keylock switch from the background mode. Crystal 34 is coupled via conductors to pins 18 and 19 of the microcontroller. Similarly, watchdog module 36 is coupled to pins 04 and 09 of the microcontroller. (The crystal 34 is not an interrupt source and the watchdog circuit 36 is used to reset the microcontroller).

Beeper 38 is controlled by an internal timer interrupt and is coupled through module 40 to pins 01 and 02 of microcontroller 12. Module 40 is a high current driver and supplies current through network 42 to the beeper. Any off-the-shelf high current driver module can be used for module 40. In the preferred embodiment of this invention a module identified by part number 75451 and manufactured by Texas Instruments Corporation (TI) was used.

Pins 30 and 32-39 of microcontroller 12 are used for interconnecting static RAM 41 and latch 44 to the microcontroller. Both static RAM 41 and latch 44 are conventional devices and details will not be given. The static RAM and the latch are connected to common data lines. In this configuration the address of the RAM is first outputted on the lines and are latched into latch 44. After latching up the address that is outputted on the bus, the data is next transmitted to the RAM.

The microcontroller scans the keyboard assembly 46 from the background mode. The keyboard assembly is coupled through a 4-16 decoder module 48 to pins 25-28 of the microcontroller. Return signals from the keyboard 46 are fed through resistive network identified by RA to pins 21-24 of the microcontroller. As will be explaiend subsequently in the preferred embodiment of this invention, the code that monitors the key stroke is run on the background level of the controller. Whenever an interrupt occurs, the processor temporarily branches from this code to service the interrupt. The LED portion of the keyboard is fed through LED driver module 50 to pins 06, 07, 08 and 14 of the microcontroller. Yet another source of interrupt that is not shown in FIG. 1 is the interrupt caused by an internal source. Such internal source may be a timer. Generally, the timer is set to generate an interrupt at specific time intervals. As soon as a time interval is reached, the timer generates an interrupt and the microcontroller is forced to branch from the code which is being executed to examine some new event. Usually the microcontroller has to execute a new set of code to service the new event.

Figure 2:
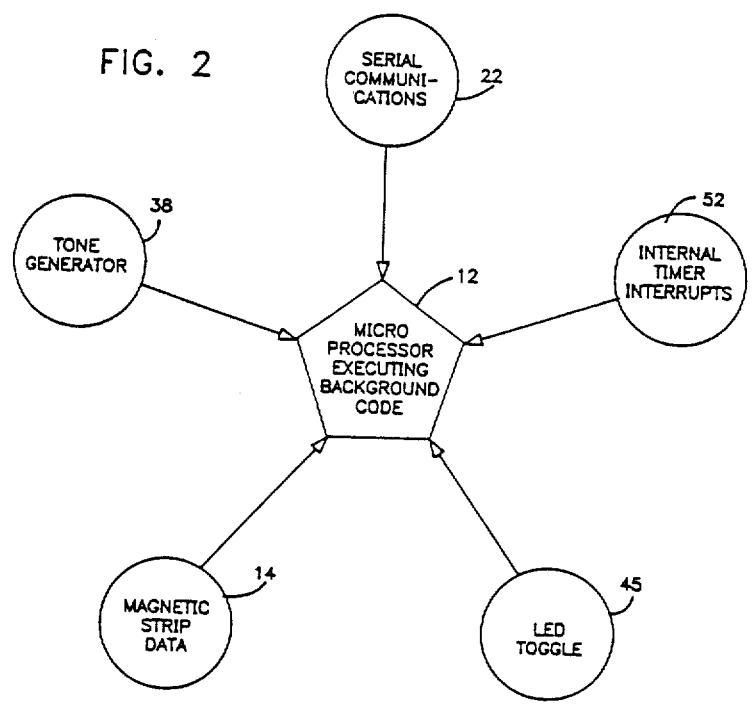
FIG. 2 shows a conceptual schematic of the asynchronous tasks to be controlled by the processor.

FIG. 2 shows a conceptual representation of a microprocessor and the events or I/O units that it is designed to control. Some of these I/O units require attention on the interrupt level. In order to simplify the description of the present invention, elements of FIG. 2 that are common to elements in FIG. 1 will be identified by the same numeral. Numeral 12 identifies the microprocessor which is executing background code. As state previously, the background code is used to monitor keyboard 46, the LEDs 45, manager keylock 28 and RAM 41. The sources that can raise interrupt and force the microprocessor to branch are serial communications channel 22, internal timer interrupts 52 (includes tone generator signals for beeper 38) and magnetic stripe data from magnetic stripe reader 14. It should be noted that these interrupts are asynchronous to the background code.

They are asynchronous because any of the I/O devices can raise its interrupt request line at any time. Moreover, the microprocessor cannot predict when any or all of these interrupt request lines will be raised.

Figure 3A:
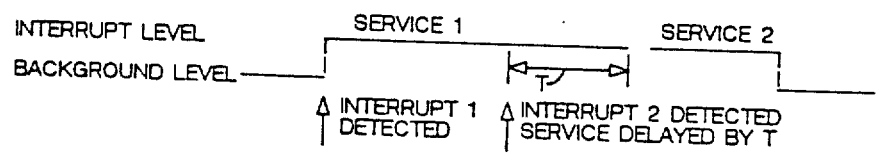
FIG. 3A shows a timing diagram for the method set forth in FIG. 3.
Figure 3:
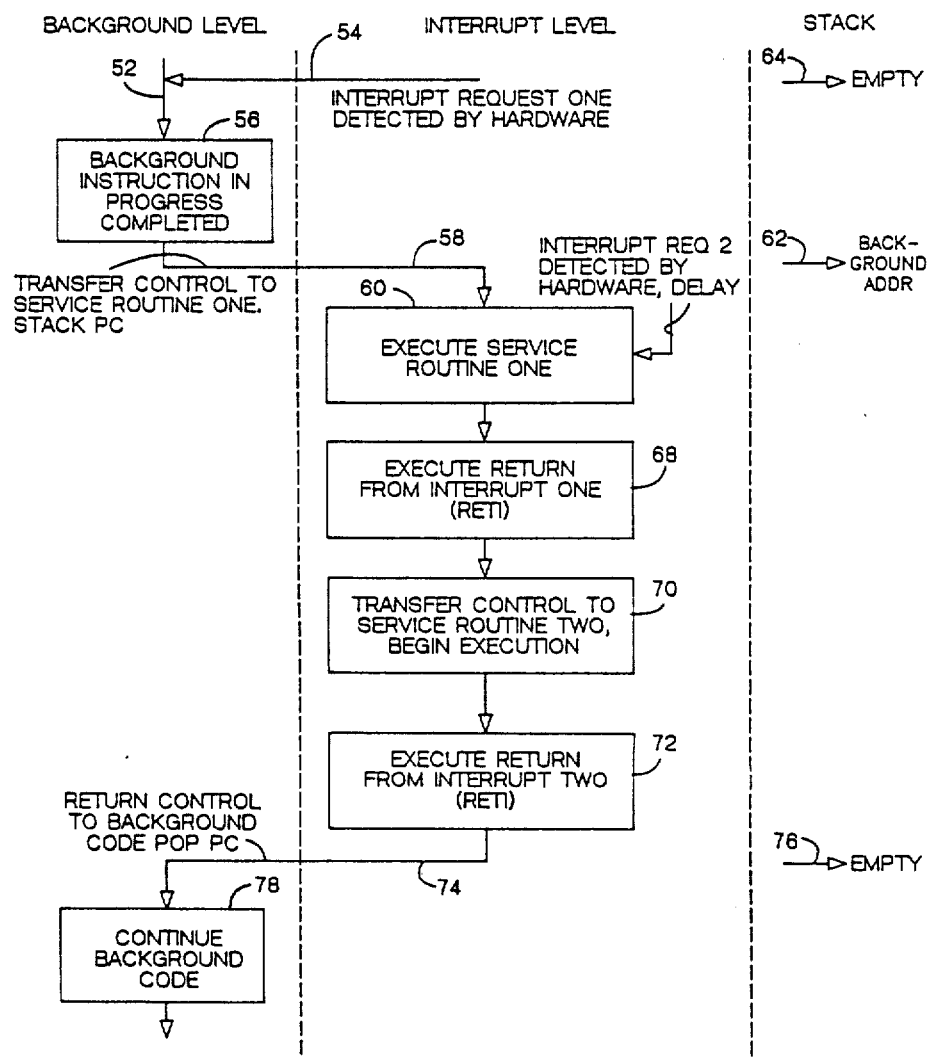
FIG. 3 shows a functional flow chart for a straight-forward technique used to process interrupts.

FIG. 3 shows a conceptual flow chart for a straightforward approach for handling interrupt requests. Because the interrupt requests are asynchronous in nature, it is inevitable that two or more with the same priority level will require service during the same time interval. Essentially, once the processor accepts an interrupt request and begins to execute code to service that interrupt, it will not accept another interrupt until it completes processing the code. New interrupt requests are queued pending subsequent servicing. This situation is depicted in FIG. 3. The column labeled "Background Level" represents the level on which background codes (i.e., low priority code) is being executed. The second column labeled "Interrupt Level" represents the level on which code for servicing interrupt requests is being executed. This level is sometimes called the foregound level. The third column labeled "Stack" represents a storage area to which the microprocessor transfers program addresses whenever an interrupt request is taken. Stated another way, whenever the processor branches, the next sequential address in the program from which it branches is stored on the stack. The addres is kept in a program counter (PC). By storing the contents of the program counter on the stack, whenever the processor completes executing the code that services the interrupt, it can resume the next sequential address in the program that it was executing at the time the interrupt occurred. Finally, the direction of the arrows in FIG. 3 indicates the direction in which a program flows.

Thus, arrow 52 indicates that the processor is executing code on the background level when an interrupt request 1 occurs on arrow 54. The interrupt request 1 is detected by the 8051 hardware. The processor completes the background instruction it was processing at the time of the interrupt (block 56). As is indicated by arrow 58, program control is transferred from the background level to the interrupt level. STated another way, the program branches from the background code to execute service routine one code, block 60. In addition, the background address in the program counter (PC) is placed on the stack, arrow 62. It should be noted that prior to stacking the background address at arrow 62 the stack was empty, arrow 64. While executing service routine 1 in block 60, if interrupt request 2 (arrow 66) is detected, it is delayed until the execution of the service routine one code is completed. The program then descends into block 68. In block 68 the program executes an instruction called "Return from Interrupt" (RETI). This is a standard 8051 instruction and details will not be given. Suffice it to say that the function which the instruction performs is given in block 70. Essentially, control is transferred to the service routine for processing interrupt request 2. Upon completing execution of the code that services the interrupt request 2, the program descends into block 72. In block 72 the program executes the RETI instruction. This returns control of the program to the background level as is shown by arrow 74. The instruction also removes the background address which was stacked at arrow 62, reloads it in the program counter and leaves the stack empty, arrow 76. As is shown in block 78, the program continues to process the background code.

FIG. 3A shows a timing diagram for the process steps outlined in FIG. 3. The timing diagram is helpful in understanding the problem that the straightforward approach of FIG. 3 creates. As can be seen from the graph, as soon as interrupt 1 is detected, the code (service 1) for servicing the interrupt is initiated. However, servicing of interrupt 2 is delayed by time, T, before servicing begins. This delay cannot be tolerated since valuable data could be lost during the delay between recognizing the interrupt request and the actual time when processing of the interrupt begins.

FIG. 4 shows a conceptual approach for handling interrupts according to the teaching of the present invention. The improved technique is such that there is no delay between the servicing of the second request when the processor is already servicing a first request. Essentially, when the processor receives a first interrupt request, the code for servicing the request is executed on the background level. With the program running in the background mode, all indicia such as flags, etc. that are set by the hardware are cleared, thus freeing the processor to accept interrupt requests on the same interrupt level. As with FIG. 3, FIG. 4 shows that a program for servicing an interrupt can be executed on a background level or on an interrupt level. As the processor branches from running code on the background level to run code at the interrupt level, the contents of the program counter are stored on the PC stack.

Arrow 77 indicates that the processor in executing code on the background level when it detects an interrupt request 1. The interrupt request 1 originates on the interrupt level and is shown by arrow 79. The interrupt request is detected by the 8051 hardware. Block 80 and arrow 83 indicate that the processor completes the instruction in process and transfers control to service routine 1. The background address in the program counter is placed on the stack, arrow 82. The processor then accesses block 84 on the interrupt level. In block 84 the processor executes a call to sub-routine "Label2" (call). By executing the instruction in block 84, the processor places the next sequential instruction address on the stack on top of the background address. This is represented by arrow 86. The next sequential address is the address for service routine 1 which is shown in block 90. Following block 84 the processor descends into block 81. In block 81 the processor executes the RETI instruction. This instruction returns control to the background level. The instruction also removes the next sequential instruction address at arrow 86 and loads it in the program counter, thus leaving only the background address at arrow 92 on the stack. It should be noted that in order to force the processor to execute the codes for servicing the first interrupt on the background level the instructions in blocks 84 and 81 must be executed in the order shown. By executing the named instructions in the order shown, all indicia of processor being busy which are usually set when an interrupt request is taken are cleared and the processor is now free to accept additional interrupt requests.

The instructions in blocks 84 and 81 are 8051 instructions and, therefore, details will not be given. If one desires to obtain additional information about these instructions, then one can consult the documentation which is supplied with the 8051 microcontroller. In addition, if one wishes to use another microprocessor, then similar instructions have to be processed in order to force the processor to service the interrupt on a background level. Following its return from the interrupt level, the first block which the processor enters is block 90. In block 90 the processor begins to execute the code that services interrupt request 1. During the execution of this code, interrupt request 2 is received on arrow 94. The program descends into block 96 and arrow 97 where it completes the instruction in progress and transfers control to service routine 2. Simultaneously the sub-routine address in the program counter is transferred to the stack on top of background address, at arrow 98.

The sub-routine address at arrow 98 is the location in service routine 1 whereat the processor will continue to execute service routine 1 in order to service interrupt 1. Stated another way, the sub-routine address at arrow 98 is the address of block 104. Following the transfer of control from service routine 1 to service routine 2, the processor enters block 100. In block 100 the processor executes service routine 2. Service routine 2 represents the code that the processor must execute in order to clear interrupt request 2. Having completed the code for clearing interrupt request 2, the processor descends into block 102. In block 102 the processor executes the (RETI) instruction. As before, the (RETI) instruction returns control to the background code and transfers the sub-routine address at arrow 98 to the program counter. The processor then completes the execution of the service routine 1 code. The processor then descends into block 106. In block 106 the processor executes a "sub-routine return" (RET) instructional. This is an 8051 conventional instruction which removes the background address at arrow 108 to the program counter. The procedure of transferring addresses from the stack to the program counter is referred to in block 106 and throughout this description as "pop stack". From block 106 the program descends into block 110, whereat it continues to execute the background code. It should be noted that the stack is now empty and the processor will continue to execute code on the background level until another series of interrupts occur.

FIG. 5 shows a timing diagram for the procedure set forth in FIG. 4. As is obvious from the diagram, interrupt 1 and interrupt hardware 2 can co-exist on the same interrupt level without delaying the servicing of interrupt 2. Stated another way, interrupt 2, which cannot tolerate delays, will be services immediately regardless of the activity of interrupt 1.

While the invention has been particularly shown and described with reference to the preferred embodiments thereof, it will be understood by those skilled in the art that various changes in form and details may be made therein without departing from the spirit and scope of the invention.

Having thus described our invention, what we claim and desire to secure as Letters Patent is as follows:

1. A method for prioritizing a single interrupt priority level in a processor so that the processor can service multiple events having different degree of urgency without queuing interrupt requests occurring on said single interrupt priority level said method comprising the steps of:

(a) accepting on said single interrupt priority level a first interrupt request from a source requiring service;

(b) storing at a memory location the address for a next sequential instruction in a background routine which is currently being executed by the processor at the time the first interrupt request occurred;

(c) identifying the location address whereat the code for servicing the first interrupt request is being stored;

(d) at the location identified in step (c) above, executing in said processor a set of commands which adjusts the state of the processor to accept a second interrupt request on the single priority interrupt level and arranging the addresses in steps (b) and (c) in a stack with the address in step (c) being first in the stack;

(e) go to the first address listed in the stack of step d and begin to execute the code for servicing the first interrupt request;

(f) accepting a second interrupt request on said single interrupt priority level;

(g) temporarily putting aside the processing of the code in step (a);

(h) executing all the codes for servicing the second interrupt request;

(i) following the execution of the codes in step (h), executing a second command which causes the processor to go to the address where the partially processed code of step (g) is located and completing the execution of the code which services the first interrupt request; and (j) executing a third command which causes the processor to go to the second address listed in the stack of step (d) and continue the execution of the background routine.

2. In a data processing system having a central processing unit (processor) for performing arithmetical and logical functions, an instruction set for controlling the operation of said processor, at least one program counter for containing sequential addresses of instructions and/or codes to be executed, a program stack operable for saving the contents of the program counter and an interrupt system operable when activated to cause the processor to execute a program for servicing a particular event, a method for allowing multiple devices to be services on a single interrupt priority level with a low priority device having the execution of its service routine delayed until the service routine of a high priority device is completed comprising the steps of:

(a) generating at a device a first interrupt request signal on the single interrupt priority level on the occurrence of a particular event;

(b) receiving the first interrupt request signal at the processor;

(c) storing the contents of the program counter on the stack;

(d) accessing an address whereat a first set of code for servicing the device which generates the first interrupt request is located;

(e) executing a set of selective instructions which causes the processor to clear all busy indicia and places it in a state to accept a second interrupt request generated by a second device on the single interrupt priority level;

(f) beginning to execute the first set of code for servicing the device which generates the first interrupt request signal; and (g) temporarily terminating the execution of the first set of code and save the next sequential address of said set of code on the program stack and then executing a second set of code designed for servicing the second device only if the second interrupt request occurs on said single interrupt priority level.

3. The method of claim 2 wherein the instructions of step (e) includes a (CALL) sub-routine followed by a return from interrupt (RETI).

4. In a data processing system having a central processing unit (processor) for performing arithmetical and logical functions, an instruction set for controlling the operation of said processor, at least one program counter for containing sequential addresses of instructions and/or codes to be executed, a program stack operable for saving the contents of the program counter and an interrupt system operable when activated to cause the processor to execute a program for servicing a particular event, a method for allowing plural devices to be services on a single interrupt priority level with a low priority device having the execution of its service routine delayed until the service routine of a high priority device is completed comprising the steps of:

(a) generating at a device external to said processor a first interrupt request signal on the single interrupt priority level on the occurrence of a particular event requiring servicing by the processor;

(b) receiving, at the processor on the single interrupt priority level, the first interrupt request priority signal;

(c) storing the contents of the program counter on the stack;

(d) going to an address whereat a set of code for servicing the first interrupt is located;

(e) executing a first instruction which places the beginning address of the first set of code for servicing said interrupt request on the stack;

(f) executing a second instruction which causes the address in step (d) to be loaded in the program counter and condition the microprocessor to accept a second interrupt request on the single interrupt priority level;

(g) beginning to execute the first set of code at the address in the program counter of step (e);

(h) accepting in the processor a second interrupt request which occurs on the single interrupt priority level;

(i) temporarily discontinuing the processing of the code in step (g) and saving the next sequential address ins aid code on the stack;

(j) executing a second set of code for servicing the device generating the second interrupt request;

(k) executing a third instruction which causes the next sequential address of step (i) to be transformed from the stack into the program counter and beginning at the next sequential address complete processing the first set of code.

* * * * *